United States Patent
Favor et al.

(10) Patent No.: US 11,907,369 B2
(45) Date of Patent: *Feb. 20, 2024

(54) PROCESSOR THAT MITIGATES SIDE CHANNEL ATTACKS BY PREVENTING CACHE MEMORY STATE FROM BEING AFFECTED BY A MISSING LOAD OPERATION BY INHIBITING OR CANCELING A FILL REQUEST OF THE LOAD OPERATION IF AN OLDER LOAD GENERATES A NEED FOR AN ARCHITECTURAL EXCEPTION

(71) Applicant: Ventana Micro Systems Inc., San Jose, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 17/004,581

(22) Filed: Aug. 27, 2020

(65) Prior Publication Data

US 2022/0067156 A1    Mar. 3, 2022

(51) Int. Cl.
*G06F 21/56*    (2013.01)
*G06F 12/0802*    (2016.01)

(52) U.S. Cl.
CPC .......... *G06F 21/56* (2013.01); *G06F 12/0802* (2013.01); *G06F 2212/60* (2013.01)

(58) Field of Classification Search
CPC .. G06F 21/56; G06F 12/0802; G06F 2212/60; G06F 12/0895; G06F 21/556; G06F 21/75; G06F 9/30101

(Continued)

(56) References Cited

U.S. PATENT DOCUMENTS

| 4,742,451 A | 5/1988 | Bruckert et al. |
| 5,371,855 A | 12/1994 | Idleman et al. |

(Continued)

FOREIGN PATENT DOCUMENTS

| CN | 110232031 A | 9/2019 |
| JP | 2021520545 A | 8/2021 |

OTHER PUBLICATIONS

Ainsworth et al., 2020 ACM/IEEE, 47th Annual International Symposium on Computer Architecture (ISCA), "MuonTrap: Preventing Cross-Domain Spectre-Like Attacks by Capturing Speculative State", pp. 132-144 (Year: 2020).*

(Continued)

*Primary Examiner* — Khalil Naghdali
(74) *Attorney, Agent, or Firm* — E. Alan Davis; Huffman Law Group, PC

(57) ABSTRACT

An out-of-order and speculative execution microprocessor that mitigates side channel attacks includes a cache memory and fill request generation logic that generates a request to fill the cache memory with a cache line implicated by a memory address that misses in the cache memory. At least one execution pipeline receives first and second load operations, detects a condition in which the first load generates a need for an architectural exception, the second load misses in the cache memory, and the second load is newer in program order than the first load, and prevents state of the cache memory from being affected by the miss of the second load by inhibiting the fill request generation logic from generating a fill request for the second load or by canceling the fill request for the second load if the fill request generation logic has already generated the fill request for the second load.

24 Claims, 5 Drawing Sheets

(58) Field of Classification Search
USPC .......................................................... 726/23
See application file for complete search history.

(56) References Cited

U.S. PATENT DOCUMENTS

| | | | |
|---|---|---|---|
| 5,383,143 | A | 1/1995 | Crouch et al. |
| 5,479,616 | A | 12/1995 | Garibay, Jr. et al. |
| 5,561,774 | A | 10/1996 | Aikawa et al. |
| 5,778,245 | A | 7/1998 | Papworth et al. |
| 6,098,167 | A | 8/2000 | Cheong et al. |
| 7,711,763 | B2 | 5/2010 | Stribaek et al. |
| 10,116,436 | B1 | 10/2018 | Kodalapura et al. |
| 11,119,784 | B2 | 9/2021 | Branco et al. |
| 11,176,055 | B1 | 11/2021 | Mukherjee et al. |
| 11,579,884 | B2 | 2/2023 | Venkatachar et al. |
| 11,593,504 | B1 | 2/2023 | Yates et al. |
| 2004/0148468 | A1 | 7/2004 | Hooker |
| 2007/0022348 | A1 | 1/2007 | Racunas et al. |
| 2007/0028051 | A1* | 2/2007 | Williamson ........ G06F 12/0864 711/216 |
| 2007/0244950 | A1 | 10/2007 | Golic |
| 2008/0109614 | A1 | 5/2008 | Begon et al. |
| 2008/0148282 | A1* | 6/2008 | Sodani .................. G06F 9/3865 719/314 |
| 2010/0199045 | A1 | 8/2010 | Bell et al. |
| 2010/0281219 | A1 | 11/2010 | Lippert et al. |
| 2012/0159103 | A1 | 6/2012 | Peinado et al. |
| 2013/0067202 | A1* | 3/2013 | Henry ................ G06F 9/30174 712/E9.016 |
| 2013/0151819 | A1 | 6/2013 | Piry et al. |
| 2015/0089152 | A1* | 3/2015 | Busaba ............... G06F 12/0831 711/141 |
| 2015/0254189 | A1 | 9/2015 | Coppola et al. |
| 2019/0004961 | A1 | 1/2019 | Boggs et al. |
| 2019/0114422 | A1 | 4/2019 | Johnson et al. |
| 2019/0138720 | A1* | 5/2019 | Grewal ................ G06F 9/3863 |
| 2019/0266091 | A1* | 8/2019 | Robinson ............ G06F 13/1673 |
| 2019/0286821 | A1 | 9/2019 | Strogov et al. |
| 2020/0089625 | A1 | 3/2020 | Wallach |
| 2020/0133679 | A1 | 4/2020 | Brandt et al. |
| 2020/0210070 | A1 | 7/2020 | Durham |
| 2020/0250099 | A1 | 8/2020 | Campbell et al. |
| 2021/0135882 | A1 | 5/2021 | Sun et al. |
| 2021/0144517 | A1 | 5/2021 | Guim Bernat et al. |
| 2022/0067154 | A1 | 3/2022 | Favor et al. |
| 2022/0067155 | A1 | 3/2022 | Favor et al. |
| 2022/0107784 | A1 | 4/2022 | Favor et al. |
| 2022/0108012 | A1 | 4/2022 | Favor et al. |
| 2022/0108013 | A1 | 4/2022 | Favor et al. |

OTHER PUBLICATIONS

Abu-Ghazaleh, Nael et al. "How the Spectre and Meltdown Hacks Really Worked." IEEE Spectrum. Downloaded on Nov. 24, 2019 from https://spectrum.ieee.org/computing/hardware/how-the-spectre-andmeltdown-hacks-really-worked. pp. 1-10.
Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.
Frogh, Anders et al. "Wrangling the Ghost: An Inside Story of Mitigating Speculative Execution Side Channel Vulnerabilities." Microsoft. Downloaded on Nov. 24, 2019 from https://i.blackhat.com/us-18/Thu-August-9/us-18-Fogh-Ertl-Wrangling-with-the-Ghost-An-Inside-Story-of-Mitigating-Speculative-Execution-Side-Channels-Vulnerabilities.pdf. pp. 1-44.
Intel Analysis of Speculative Execution Side Channels. White Paper. Revision 1.0. Jan. 2018. Document No. 336983-001. pp. 1-12.
Cache Speculation Side-Channels. Whitepaper. Arm Limited. Version 2.4. Oct. 2018. pp. 1-21.
Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.
Yarom, Yuval et al. "Flush+Reload: a High Resolution, Low Noise, L3 Cache Side-Channel Attack." The University of Adelaide. Computer Science, IACR Cryptol. ePrint Arch. 2013. pp. 1-14.
Ge, Qian et al. "A Survey of Microarchitectural Timing Attacks and Countermeasures on Contemporary Hardware." *Journal of Cryptographic Engineering* 8, Apr. 2018. pp. 1-37.
Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.
Do, Sang Wook Stephen et al. "Transaction-Based Core Reliability." 2020 IEEE International Parallel and Distributed Processing Symposium (IPDPS). pp. 168-179 DOI: 10.1109/IPDPS47924.2020.00027.
Saporito, A. et al., IBM J. RES. & DEV, "Design of the IBM z15 Microprocessor." Published Jul. 10th 2020, pp. 7:1-7:18 (Year: 2020).

* cited by examiner

PROCESSOR THAT MITIGATES SIDE CHANNEL ATTACKS BY PREVENTING CACHE MEMORY STATE FROM BEING AFFECTED BY A MISSING LOAD OPERATION BY INHIBITING OR CANCELING A FILL REQUEST OF THE LOAD OPERATION IF AN OLDER LOAD GENERATES A NEED FOR AN ARCHITECTURAL EXCEPTION

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attach. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system (OS) shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2[index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1 [index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1. However, because the branch predictor has been maliciously mis-trained, it predicts that the malicious index1 value is in the bounds of array 1 (i.e., index1<array1size). Therefore, the processor speculatively executes "array1[index1]" using the malicious index1 value. This results in the secret data byte value being loaded from the out-of-bounds location in the victim's memory into a register of the processor, namely from the address of the secret data byte.

Because the attacker flushed the value of array1_size from cache prior to invoking the victim code, the processor must bring in array1_size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2[probe_value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it is likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array, (4) through speculative execution because of the branch prediction, indexing the first array with the malicious value in order to retrieve the secret byte, (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache liens, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "RIDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an operation is committed to cache memory, it is temporarily stored in a store buffer—a table of address, value, and "is valid" entries. Speculative store-to-load forwarding logic enables the store buffer to forward store data to be used as operands in younger operations. Fallout exploits this to monitor recent stores performed by other programs, containers, operating systems, and virtual machines running on the same hardware thread.

The RIDL or MFBDS variant exploits the design of fill buffers in some processors that support hyper-threading. Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious operation even as the load port data is in-flight to the register file. Because a single pass of this attack may recover only some of the bits, the attack may be run repeatedly to probabilistically discover a more complete set of data.

SUMMARY

In one embodiment, the present disclosure provides a microprocessor that mitigates side channel attacks. The microprocessor includes a cache memory and fill request generation logic configured to generate a request to fill the cache memory with a cache line implicated by a memory address that misses in the cache memory. The processor is configured to perform speculative execution of instructions. The processor is configured to execute instructions out of program order. The microprocessor also includes at least one execution pipeline configured to receive first and second load operations, to detect a condition in which the first load operation generates a need for an architectural exception, the second load operation misses in the cache memory, and the second load operation is newer in program order than the first load operation, and to prevent state of the cache memory from being affected by the miss of the second load operation by inhibiting the fill request generation logic from generating a fill request for the second load operation or by canceling the fill request for the second load operation if the fill request generation logic has already generated the fill request for the second load operation.

In another embodiment, the present disclosure provides a method for mitigating side channel attacks in a microprocessor having a cache memory, at least one execution pipeline, and fill request generation logic configured to generate a request to fill the cache memory with a cache line implicated by a memory address that misses in the cache memory. The processor is configured to perform speculative execution of instructions and to execute instructions out of program order. The method includes receiving, by the at least one execution pipeline, first and second load operations. The method also includes detecting, by the at least one execution pipeline, a condition in which the first load operation generates a need for an architectural exception, the second load operation misses in the cache memory, and the second load operation is newer in program order than the first load operation. The method also includes preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation.

In yet another embodiment, the present disclosure provides a non-transitory computer-readable medium having instructions stored thereon that are capable of causing or configuring a microprocessor for mitigating side channel attacks, the microprocessor having a cache memory, at least one execution pipeline, and fill request generation logic configured to generate a request to fill the cache memory with a cache line implicated by a memory address that misses in the cache memory, wherein the microprocessor is configured by the instructions to perform operations. The operations include receiving, by the at least one execution pipeline, first and second load operations. The operations also include detecting, by the at least one execution pipeline, a condition in which the first load operation generates a need for an architectural exception, the second load operation misses in the cache memory, and the second load operation is newer in program order than the first load operation. The operations also include preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation.

DETAILED DESCRIPTION

As may be observed from the foregoing, SCAs prey on processors that engage in speculative execution of instructions. Stated alternatively, speculative execution is a critical component to SCA vulnerability. As may also be observed from the foregoing, SCAs exploit the micro-architectural state of data caches of processors that engage in speculative execution of instructions as side channels. However, speculative execution significantly improve processor performance. Therefore, high performance processors will continue to engage in speculative execution. Embodiments of processors and methods are described herein that mitigate SCAs by allowing speculative and out-of-order execution, but that prevent cache state from being affected by a miss of a speculatively executed load operation that architecturally will not be executed because an older load operation generated an architectural exception. In particular, the embodiments mitigate Meltdown-style SCAs because they inhibit generation of a fill request for the newer load when an older load generates a need for the architectural exception or, if the fill request was already generated, the embodiments cancel the fill request. The embodiments may also mitigate SCAs other than Meltdown-style SCAs, both current and future.

Figure 1:
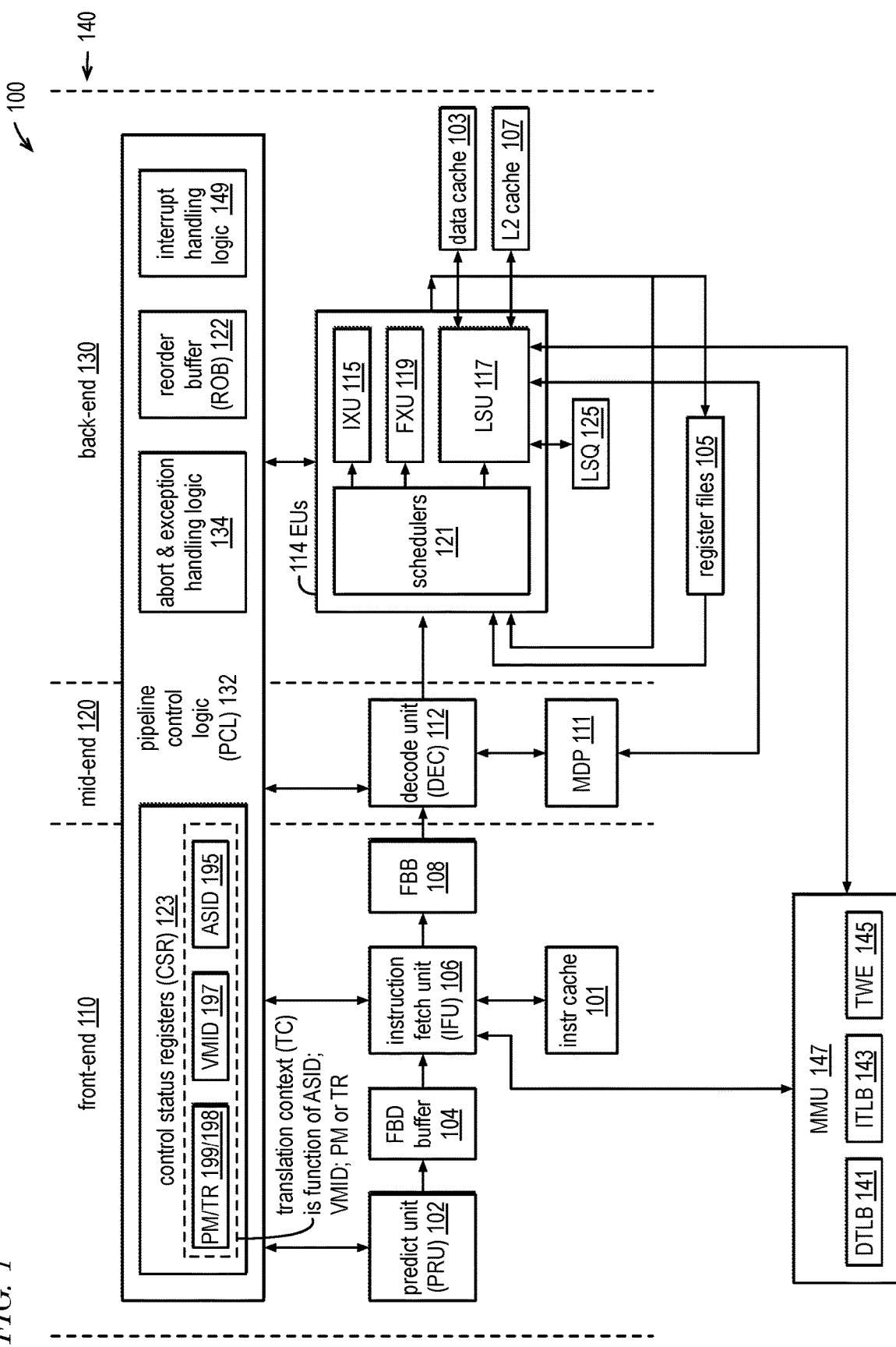
FIG. 1 is an example block diagram of a pipelined super-scalar, out-of-order execution microprocessor core that performs speculative execution in accordance with an embodiment of the present disclosure.

FIG. 1 is an example block diagram of a pipelined super-scalar, out-of-order execution microprocessor core 100 that performs speculative execution of instructions in accordance with embodiments of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, level-2 (L2) cache 107, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed. The microprocessor 110 may also include other blocks not shown, such as a write combining buffer, a load buffer, a bus interface unit, and various levels of cache memory above the instruction cache 101 and data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or a translation regime (TR), which is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each TR or PM.

The pipeline units may signal a need for an abort, as described in more detail below, e.g., in response to detection of a mis-prediction (e.g., by a branch predictor of a direction or target address of a branch instruction, or of a mis-prediction that store data should be forwarded to a load Op in response to a store dependence prediction, e.g., by the MDP 111) or other microarchitectural exception, architectural exception, or interrupt. Examples of architectural exceptions include an invalid opcode fault, debug breakpoint, or illegal instruction fault (e.g., insufficient privilege mode) that may be detected by the DEC 112, a page fault, permission violation or access fault that may be detected by the LSU 117, and an attempt to fetch an instruction from a non-executable page or a page the current process does not have permission to access that may be detected by the IFU 106. In response, the PCL 132 may assert flush signals to selectively flush instructions/Ops from the various units of the pipeline 140. Conventionally, exceptions are categorized as either faults, traps, or aborts. The term "abort" as used herein is not limited to the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism may also be used to handle architectural exceptions and for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Because the ROB 122 retires all Ops and their associated instructions in program order, some Ops may complete execution many cycles before they can be retired or aborted. For example, a speculatively executed instruction may need to be aborted due to detection of a mis-prediction or an architectural exception. The mis-prediction may have been made for the speculatively executed instruction or for an older instruction in program order than the speculatively executed instruction, and the architectural exception could be generated by the speculatively executed instruction or by an older instruction in program order than the speculatively executed instruction. For example, a speculatively executed instruction that loads a secret data byte from a memory address could complete its speculative execution before the processor detects a mis-prediction or architectural exception. For another example, a speculatively executed load/store instruction that uses the secret data byte value—e.g., to modify a previously flushed cache that becomes a side channel to be probed by an SCA to indirectly detect the value of the secret data byte—could complete before the processor detects the mis-prediction or the architectural exception. However, advantageously, embodiments are described in which a fill request for a cache missing load operation is inhibited or canceled if it is newer in program order than a load operation that generates a need for an architectural exception, e.g., attempt to access an impermissible or inaccessible memory location.

Figure 2:
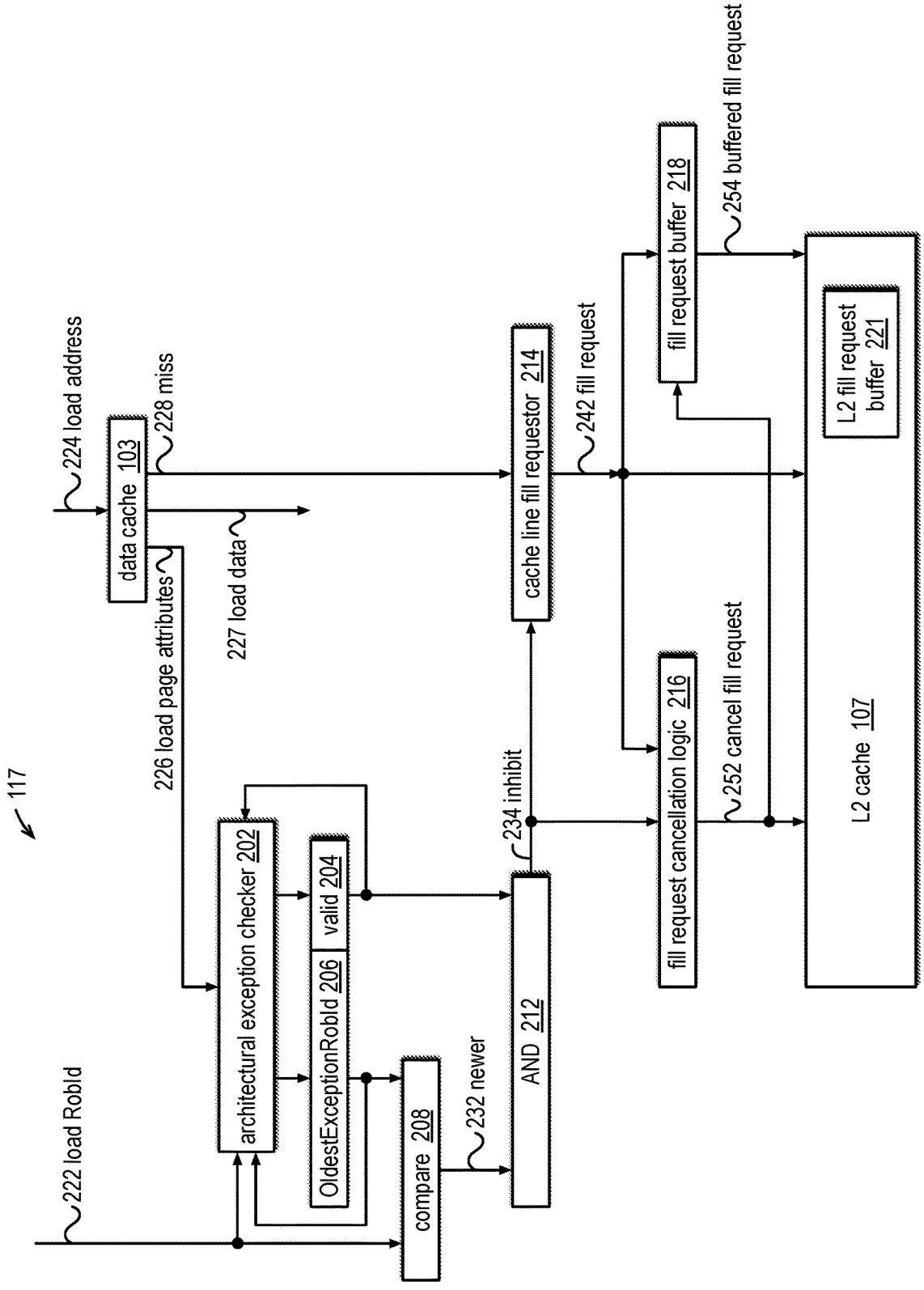
FIG. 2 is an example block diagram of the load-store unit of FIG. 1 in accordance with embodiments of the present disclosure.

FIG. 2 is an example block diagram of the LSU 117 of FIG. 1 in accordance with embodiments of the present disclosure. The LSU 117 is shown in communication with the data cache 103 and the L2 cache 107. The L2 cache 107 includes an L2 fill request buffer 221 whose use is described in more detail below. The LSU 117 includes architectural exception checking logic 202, a valid bit register 204, an OldestExceptionRobId register 206, a comparator 208, an AND gate 212, a cache line fill requestor 214, fill request cancellation logic 216, and a fill request buffer 218. The data cache 103 of FIG. 1 receives a virtual load address 224 of a load operation and in response generates a miss indicator 228 that indicates whether or not the load address 224 hits or misses in the data cache 103. If the load address 224 hits, the data cache 103 also provides load data 227. The data cache 103 also provides page attributes 226 of the page of memory implicated by the load address 224. When the miss indicator 228 indicates a miss for the load operation (or store operation), the cache line fill requestor 214 generates a cache line fill request 242 to the L2 cache 107, unless inhibited from doing so by an inhibit signal 234, as described in more detail below.

The fill request 242 is received by the L2 cache 107 into the L2 fill request buffer 221. In some instances, the cache line fill requestor 214 may not be able to send the fill request 242 to the L2 cache 107 immediately, e.g., the L2 fill request buffer 221 is full. In such instances, the fill request 242 is pushed into the fill request buffer 218 and subsequently sent to the L2 cache 107, e.g., once the L2 fill request buffer 221 is no longer full.

The OldestExceptionRobId register 206 holds the identifier of the entry in the ROB 122 that is allocated to the oldest load/store operation that has generated a need for an architectural exception. The valid bit 204 indicates whether the value in the OldestExceptionRobId register 206 is valid.

The architectural exception checker 202 receives the page attributes 226, a load RobId 222 of the load operation, the OldestExceptionRobId 206, and the valid bit 204. The architectural exception checker 202 examines the page attributes 226 of the load to determine whether the load operation generates the need for an architectural exception. In one embodiment, the architectural exception checker 202 determines the load operation generates the need for an architectural exception when the page attributes 226 of the load indicate that the load address 224 is inaccessible (e.g., no valid translation is available because a present or valid bit in a page table entry is clear) or the load operation does not have permission to access the load address 224 (e.g., there is a valid translation but the permission bits indicate no permission). If the load generates a need for an architectural exception, if the valid bit 204 is set, and if the load RobId 222 is older than the OldestExceptionRobId 206, then the architectural exception checker 202 updates the OldestExceptionRobId 206 with the load RobId 222 and sets the valid bit 204. In this manner, the RobID of a load operation that generates the need for an architectural exception will be recorded in the OldestExceptionRobId 206 for use during execution of other load operations to decide whether cache line fill requests of the other load operations should be inhibited or canceled. As described above, the LSU 117 may comprise multiple pipelines for concurrently executing multiple load operations. In one embodiment, the OldestExceptionRobId 206 is updated by and shared by all the pipelines.

To determine whether a fill request should be inhibited or canceled, the comparator 208 compares the load RobId 222 with the OldestExceptionRobId 206 to generate a newer indicator 232 that indicates whether the load is newer in program order than the load operation indicated by the OldestExceptionRobId 206. The AND gate 212 outputs a true value on the inhibit signal 234 if the valid bit 204 and the newer 232 indicator are both set. If the inhibit signal 234 is true, the cache line fill requestor 214 does not generate a fill request 242 for the missing load operation.

Advantageously, inhibiting the fill request associated with the speculatively executed load operation may mitigate SCAs. For example, assume an SCA flushes the data cache 103, assume the older load operation indicated by the OldestExceptionRobId 206 is a first load operation of a Meltdown-style SCA that is attempting to read a secret byte from an address that it does not have permission to access, and assume the newer missing load is a second load operation of the Meltdown-style SCA that uses the secret byte value from the first load to form its load address 224 in order to fill the cache line at the second load operation address in order to speculatively update the state of the data cache 103 to create a side channel that may later be probed to indirectly detect the secret byte value. By inhibiting the cache fill request, there are no side effects on the data cache 103. That is, the state of the data cache 103 is unaffected by the miss of the speculatively executed newer/second load operation thereby foiling the SCA from creating a side channel of the data cache 103.

In many instances, the LSU 117 may be able to inhibit the fill request for the missing/second load operation, although in others it may not. Factors that affect the ability of the LSU 117 to inhibit the fill request include the time of issuance of the first and second load operations relative to one another, whether the second load operation is dependent on the result (i.e., load data) of the first load operation, and parameters of the LSU 117, such as the load-to-use latency of the LSU 117 and the inhibit latency. The inhibit latency may be considered the time from issuance of a load operation (e.g., the first load operation) to generation of the inhibit signal 234, which in the embodiment of FIG. 2 may include detection of the need for an architectural exception by the architectural exception checker 202, update of the OldestExceptionRobId 206 and valid bit 204, and propagation delay through the comparator 208 and AND gate 212, as well as any relevant pipeline stage register delays. The load-to-use latency is the number of clock cycles from issuance of a load operation to the availability of the load result (assuming a cache hit) for operations that are dependent on the load result. Therefore, the scheduler 121 waits to issue an operation that is dependent on a load instruction until at least the load-to-use latency number of clocks after the load operation was issued.

As an example, if the second load operation is dependent on the first load operation and the load-to-use latency is greater than the inhibit latency, then the inhibit signal 234 will be able to inhibit the fill request, since the scheduler 121 will delay issuance of the second load operation after issuance of the first load operation at least by the load-to-use latency. For another example, even if the second load operation is independent of the first load operation, due to the operation mix of the program and utilization of the pipelines of the LSU 117, the second load operation may get issued by the scheduler 121 at least the inhibit latency after the first load operation such that the inhibit signal 234 is able to inhibit the fill request.

However, in some instances the LSU 117 may not be able to inhibit the fill request for the missing/second load operation such that the cache line fill requestor 214 generates the fill request 242 that is sent to the L2 cache 107 or fill request buffer 218. In such instances, the LSU 117 cancels the fill request. The fill request cancellation logic 216 receives the inhibit signal 234 and the fill request signal 242. If the fill request cancellation logic 216 detects that a fill request 242 has been made and that subsequently the inhibit signal 234 indicated that the same fill request 242 is to be inhibited, then the fill request cancellation logic 216 asserts a cancel fill request signal 252 to cancel the fill request 242 that was attempted to be inhibited. If the fill request is in the fill request buffer 218, the fill request buffer 218 clears (e.g., invalidates) the entry occupied by the fill request. If the fill request is in the L2 fill request buffer 221, the L2 cache 107 clears (e.g., invalidates) the entry occupied by the fill request. In one embodiment, each fill request 242 includes a small tag, or identifier, and the cancel fill request signal 252 identifies the tag of the load operation to be canceled. In other embodiments, there is a fixed timing relationship (e.g., a fixed number of clock cycles) between the generation of the fill request 242 and the generation of the cancel fill request signal 252 that enables the fill request buffer 218 and L2 cache 107 to know which fill request 242 to cancel.

Advantageously, canceling the fill request may mitigate SCAs for reasons similar to those described above with respect to the inhibiting of fill requests. By canceling the cache fill request associated with the speculatively executed second load operation, there are no side effects on the data cache 103. That is, the state of the data cache 103 is unaffected by the miss of the speculatively executed newer/second load operation thereby foiling an SCA, such as a Meltdown-style attack, from using the data cache 103 as a side channel.

Figures 3, 4:
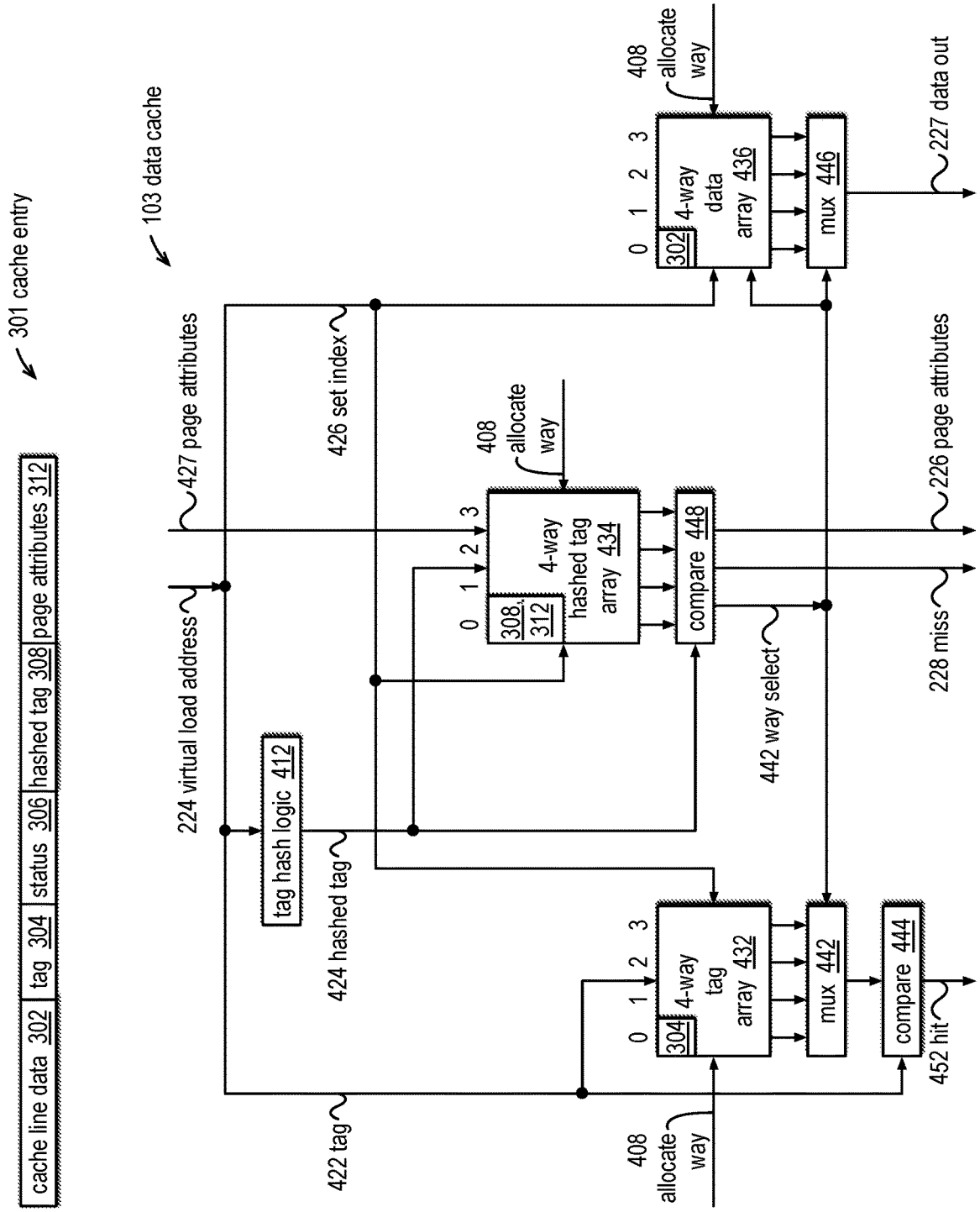
FIG. 3 is an example block diagram of a cache entry of the data cache of FIG. 1 in accordance with embodiments of the present disclosure.
FIG. 4 is an example block diagram illustrating the data cache of FIG. 1 in accordance with embodiments of the present disclosure.

FIG. 3 is an example block diagram of a cache entry 301 of data cache 103 of FIG. 1 in accordance with embodiments of the present disclosure. The cache entry 301 is used in the virtual cache embodiment of FIG. 4 described in more detail below. The cache entry 301 includes cache line data 302, a virtual address tag 304, a status field 306, a hashed tag field 308, and a page attributes field 312. The cache line data 302 is the copy of the data brought into the data cache 103 from system memory, in some embodiments indirectly through a higher level of the cache memory hierarchy, e.g., L2 cache 107.

The tag 304 is upper bits (e.g., tag bits 422 of FIG. 4) of the virtual memory address (e.g., virtual address 224 of FIG. 4) specified by the operation that brought the cache line into the data cache 103, e.g., the virtual memory address specified by a load/store operation. That is, when an entry in the data cache 103 is allocated, the tag bits 422 of the virtual memory address 224 are written to the virtual address tag 304 of the entry. When the data cache 103 is subsequently accessed (e.g., by a subsequent load/store operation), the virtual address tag 304 is used to determine whether the access hits in the data cache 103. Generally speaking, the data cache 103 uses lower bits (e.g., index bits 426 of FIG. 4) of the virtual memory address to index into the data cache 103 and uses the remaining bits of the address above the index bits as the tag bits. To illustrate by way of example, assume a 64 kilobyte (KB) data cache 103 arranged as a 4-way set associative cache having 64-byte cache lines; address bits [5:0] are an offset into the cache line, virtual address bits [13:6] (index bits) are used as the set index, and virtual address bits [N-1:14] (tag bits) are used as the tag, where N is the number of bits of the virtual memory address.

The status 306 indicates the state of the cache line. More specifically, the status 306 indicates whether the cache line data is valid or invalid. Typically, the status 306 also indicates whether the cache line has been modified since it was brought into the cache memory. The status 306 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

The hashed tag 308 is a hash of the tag bits 422 of FIG. 4 of the virtual memory address 224, as described in more detail below. Advantageously, the hashed tag 308 may be used to generate a predicted early miss indication, e.g., miss 228 of FIG. 4, and may be used to generate a predicted early way select signal, e.g., way select 442 of FIG. 4, as described in more detail with respect to FIG. 4.

The page attributes 312 are attributes of a physical memory page that includes the cache line data associated with the entry 301. The page attributes are cached versions of page attributes (e.g., page attributes 427 of FIG. 4) obtained from page translation tables during a page table walk performed (e.g., by TWE 145 of FIG. 1) in response to the virtual memory address 224 missing in the virtual data cache 103 and also missing in a second-level data translation lookaside buffer (e.g., DTLB 141 of FIG. 1). For example, the page attributes 312 may include permissions information and accessibility information. The page attributes 312 may be used by the architectural exception checker 202 of FIG. 2 to determine whether a load operation generates the need for an architectural exception.

FIG. 4 is an example block diagram illustrating the data cache 103 of FIG. 1 in accordance with embodiments of the present disclosure. In the embodiment of FIG. 4, the data cache 103 is a virtual cache, i.e., it is virtually-indexed and virtually-tagged. In the embodiment of FIG. 4, the DTLB 141 of FIG. 1 is a second-level TLB, and the processor 100 includes no first-level TLB. The data cache 103 includes a tag array 432, a data array 436, a hashed tag array 434, a multiplexer 442, a comparator 444, a multiplexer 446, and tag hash logic 412. The data cache 103 also includes a virtual load address input 224 (corresponding to the load address 224 of FIG. 2). The virtual load address 224 includes a tag 422 portion and a set index 426 portion. The data cache 103 also includes an allocate way input 408 for allocating an entry into the data cache 103. The data cache 103 also includes a data in input (not shown) for writing data into the data cache 103, e.g., during a store operation and during an allocation.

The data cache 103 also includes a hit output 452, early miss prediction 228, a page attributes 226 output, and a data out output 227 (corresponding to load data 227 of FIG. 2). The tag array 432 and data array 436 are random access memory arrays. In the embodiment of FIG. 4, the data cache 103 is arranged as a 4-way set associative cache; hence, the tag array 432 and data array 436 are arranged as 4-way set associative memory arrays. However, other embodiments are contemplated in which the associativity has a different number of ways than four, including direct-mapped and fully associative embodiments. The set index 426 selects the set of entries on each allocation or access, e.g., load operation.

In the embodiment of FIG. 4, each entry of the data cache 103 is structured as the entry 301 of FIG. 3, having cache line data 302, a tag 304, a status 306, a hashed tag 308, and page attributes 312. The data array 436 holds the cache line data 302 associated with each of the entries 301 of the data cache 103. The tag array 432 holds the tag 304 associated with each of the entries 301 of the data cache 103. The hashed tag array 434, also referred to as a hashed address directory 434, holds the hashed tag 308 and page attributes 312 associated with each of the entries 301 of the data cache 103. In one embodiment, the status 306 of each entry is also stored in the tag array 432, whereas in another embodiment the data cache 103 includes a separate memory array for storing the status 306 of the entries. Although in the embodiment of FIG. 4 the data array 436 and tag array 432 are separate, other embodiments are contemplated in which the data and tag (and status) reside in the same memory array.

The tag hash logic 412 hashes the tag 422 portion of the virtual load address 224 to generate the hashed tag 424. That is, the tag 422 is an input to a hash function performed by tag hash logic 412 that outputs the hashed tag 424. The hash function performs a logical and/or arithmetic operation on its input bits to generate output bits. For example, in one embodiment, the hash function is a logical exclusive-OR on at least a portion of the tag 422 bits. The number of output bits of the hash function is the size of the hashed tag 424 and the hashed tag field 308 field of the data cache entry 301. The hashed tag 424 is provided as an input to the hashed tag array 434 for writing into the hashed tag 308 of the selected entry 301 of the hashed tag array 434, e.g., during an allocation. Similarly, page attributes 427 obtained from page translation tables during a page table walk are written into the page attributes 312 of the selected entry 301 of the hashed tag array 434 during an allocation. The set index 426 selects the set of entries of the hashed tag array 434. In the case of an allocation, the hashed tag 424 and page attributes 427 are written into the hashed tag 308 of the entry of the way selected by an allocate way input 408 of the selected set. In the case of an access, comparator 448 compares the hashed tag 424 with each of the hashed tags 308 of the selected set. If there is a valid match, the early miss signal 228 is false and the way select 442 indicates the matching way and the page attributes 312 of the matching way are provided as page attributes 226; otherwise, the early miss signal 228 is true.

Because the hashed tag 424 and the hashed tags 308 are small (e.g., 16 bits as an illustrative example) relative to the tag 422 and tags 304 (e.g., 54 bits as an illustrative example), the comparison performed by comparator 448 may be faster than the comparison performed by comparator 444 (described more below), for example. Therefore, the way select 442 may be signaled by an earlier stage in the data cache memory 103 pipeline than an embodiment that relies on a comparison of the tags 304 of the tag array 432 to generate a way select. This may be advantageous because it may shorten the time to data out 227.

Additionally, the early miss prediction 228 may be signaled by an earlier stage than the stage that signals the hit indicator 452. This may be advantageous because it may enable cache line fill requestor 214 to generate a cache line fill request 242 to fill a missing cache line earlier than an embodiment that would rely on a comparison of the tags 304 in the tag array 432 to detect a miss. Thus, the hashed tag array 434 may enable a high performance, high frequency design of the processor 100.

It is noted that due to the nature of the hashed tag 424, if the early miss indicator 228 indicates a false value, i.e., indicates a hit, the hit indication may be incorrect, i.e., the hit indicator 452 may subsequently indicate a false value, i.e., a miss. Thus, the early miss indicator 228 is a prediction, not necessarily a correct miss indicator. This is because differing tag 422 values may hash to the same value. However, if the early miss indicator 228 indicates a true value, i.e., indicates a miss, the miss indication is correct, i.e., the hit indicator 452 will also indicate a miss, i.e., will indicate a false value. This is because if two hash results are not equal (assuming they were hashed using the same hash algorithm), then they could not have been generated from equal inputs, i.e., matching inputs.

The tag 422 is provided as an input to the tag array 432 for writing into the tag 304 field of the selected entry of the tag array 432, e.g., during an allocation. The set index 426 selects the set of entries of the tag array 432. In the case of an allocation, the tag 422 is written into the tag 304 of the entry of the way selected by the allocate way input 408 of the selected set. In the case of an access (e.g., a load operation), the mux 442 selects the tag 304 of the way selected by the early way select 442, and the comparator 444 compares the tag 422 with the tag 304 of the selected set. If there is a valid match, the hit signal 452 is true; otherwise, the hit signal 452 is false. In the embodiment of FIG. 4, the cache line fill requestor 214 of FIG. 2 advantageously uses the early miss prediction 228 provided by the hashed tag array 434 in order to generate a fill request 242 as soon as possible, rather than waiting for the hit signal 452. However, in embodiments of the LSU 117 that employ the data cache 103 of FIG. 4, the cache line fill requestor 214 is also configured to examine both the early miss prediction 228 and the hit indicator 452, detect an instance in which the early miss prediction 228 predicted a false hit, and generate a fill request 242 accordingly.

The data array 436 receives the data in input (not shown) for writing into the cache line data 302 field of the selected entry of the data array 436, e.g., during a cache line allocation or a store operation. The set index 426 selects the set of entries of the data array 436. In the case of an allocation, the way of the selected set is selected by the allocate way input 408, and in the case of a memory access operation (e.g., load/store operation) the way is selected by the way select signal 442. In the case of a read operation (e.g., load operation), the mux 446 receives the cache line data 302 of all four ways and selects one of the ways based on the way select signal 442, and the cache line data 302 selected by the mux 446 is provided on the data out output 227 (corresponding to load data 227 of FIG. 2).

Figures 5, 6:
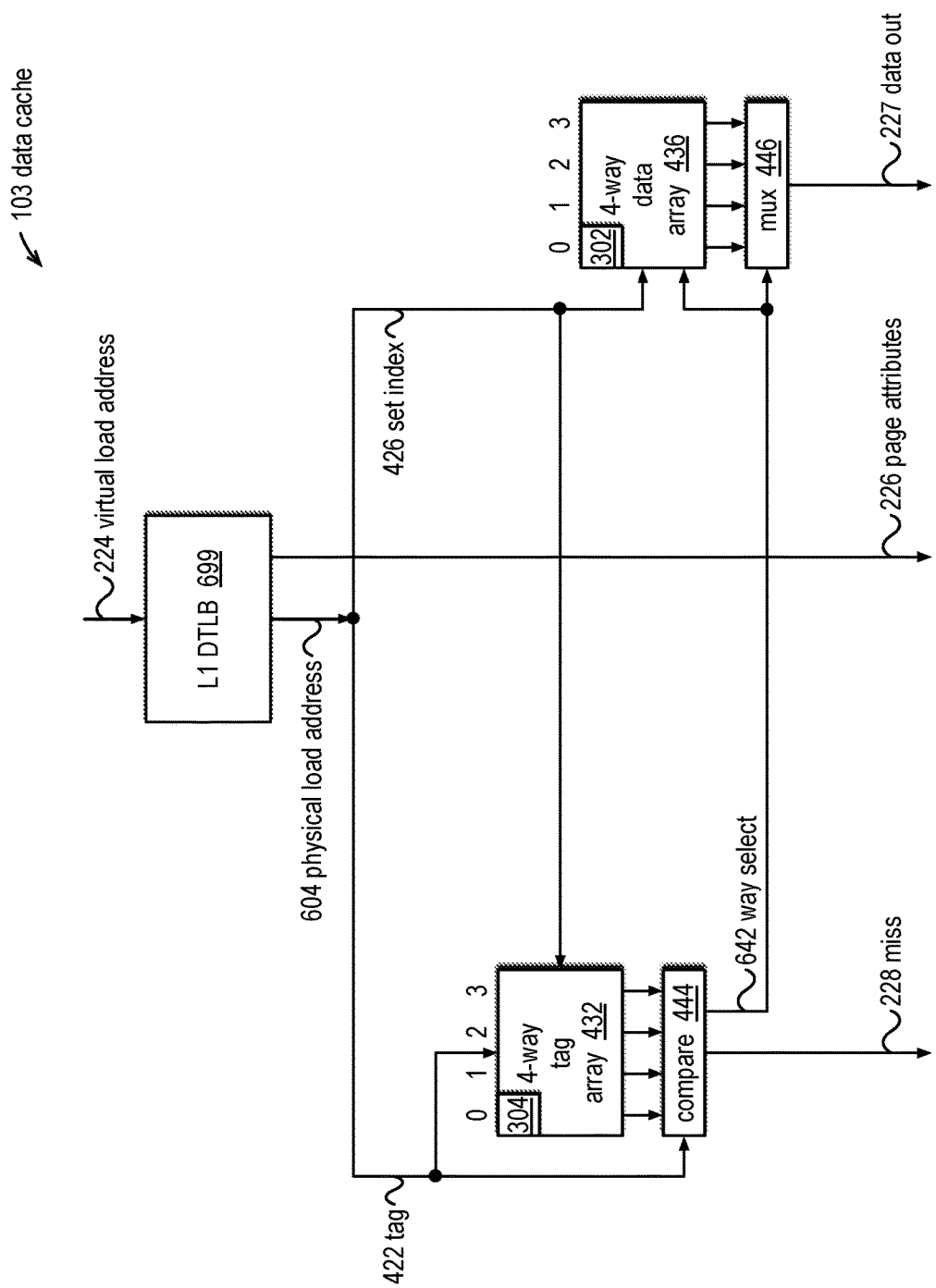
FIG. 5 is an example block diagram of a cache entry of data cache of FIG. 1 in accordance with embodiments of the present disclosure.
FIG. 6 is an example block diagram illustrating the data cache of FIG. 1 in accordance with embodiments of the present disclosure.

FIG. 5 is an example block diagram of a cache entry 501 of data cache 103 of FIG. 1 in accordance with embodiments of the present disclosure. The cache entry 501 is used in the physically-tagged cache embodiment of FIG. 6 described in more detail below. That is, the tag field 304 holds a physical address tag, rather than a virtual address tag. The cache entry 501 of FIG. 5 is similar in many respects to the cache entry 301 of FIG. 3. However, the cache entry 501 of FIG. 5 does not include a hashed tag field 308 nor a page attributes field 312.

FIG. 6 is an example block diagram illustrating the data cache 103 of FIG. 1 in accordance with embodiments of the present disclosure. The data cache 103 of FIG. 6 is similar in many respects to the data cache 103 of FIG. 4. However, in the embodiment of FIG. 6, the core 100 includes a first-level (L1) TLB 699 that receives the virtual load address 224 of FIG. 2 and outputs a physical load address 604 that is the translation of the virtual load address 224 and outputs the page attributes 226 of FIG. 2 associated with the memory page implicated by the physical load address 604. Additionally, in the embodiment of FIG. 6, the data cache 103 is physically-tagged. That is, tag 422 is the tag portion of the physical load address 604, and the set index 426 is the index portion of the physical load address 604. Still further, the data cache 103 of FIG. 6 does not include the hashed tag array 434 of FIG. 4. Finally, the comparator 444 compares the tag 422 with the tag 304 of all ways of the selected set. If there is a valid match, the hit signal 452 is true and a way select signal 642, which indicates the matching way, is provided to mux 446; otherwise, the hit signal 452 is false.

Figure 7:
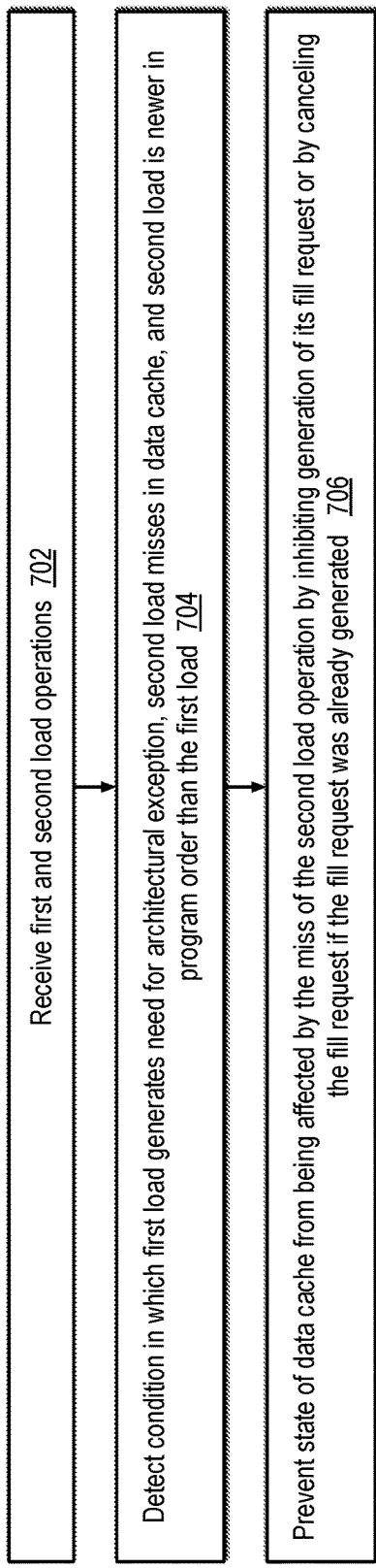
FIG. 7 is a flowchart illustrating operation of a processor to mitigate side channel attacks by inhibiting or canceling cache line fill requests under detected conditions according to embodiments of the present disclosure.

FIG. 7 is a flowchart illustrating operation of a processor (e.g., core 100 of FIG. 1 that includes the LSU 117 of FIG. 2) to mitigate side channel attacks by inhibiting or canceling cache line fill requests under detected conditions according to embodiments of the present disclosure. Operation begins at block 702.

At block 702, a load unit (e.g., LSU 117) receives first and second load operations each of which specifies a respective load address (e.g., load address 224) which is also used to access a data cache (e.g., data cache 103). The first and second load operations may be issued (e.g., by scheduler 121 to LSU 117) out of program order. Additionally, the first and second load operations may be speculatively executed by the core 100. Operation proceeds to block 704.

At block 704, a condition is detected (e.g., by LSU 117) in which the first load operation generates a need for an architectural exception, the second load operation misses in the data cache 103, and the second load operation is newer in program order than the first load operation. Operation proceeds to block 706.

At block 706, generation of a cache line fill request in response to the second load operation miss is inhibited or canceled if the fill request was already generated, thereby preventing the state of the data cache from being affected by the miss of the second load operation. In this manner, advantageously, side channel attacks may be mitigated, e.g., a Meltdown-style SCA, since the speculatively executed second load operation miss will not cause any side effects on the cache state.

Figure 8:
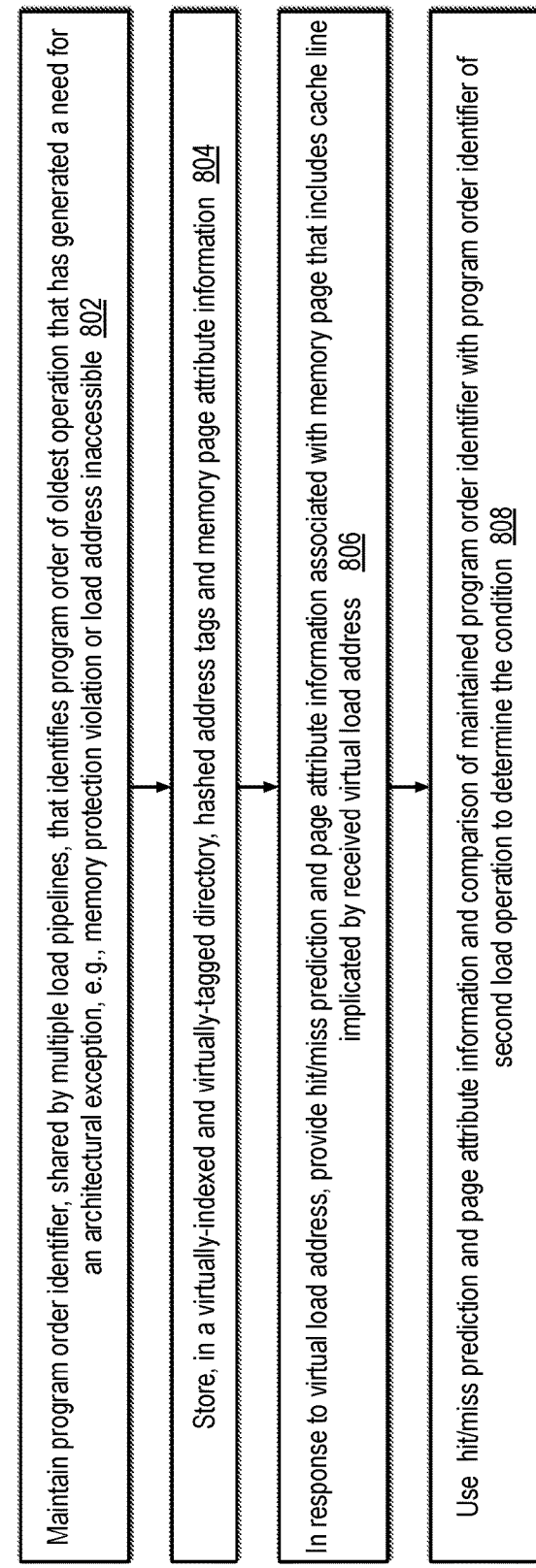
FIG. 8 is a flowchart illustrating operation of a processor to perform the second operation of FIG. 7 in more detail according to embodiments of the present disclosure.

FIG. 8 is a flowchart illustrating operation of a processor to perform the operation at block 704 of FIG. 7 in more detail according to embodiments of the present disclosure. Operation begins at block 802.

At block 802, a program order identifier (e.g., OldestExceptionRobId 206) is maintained (e.g., by LSU 117) that identifies the program order of the oldest operation that has generated a need for an architectural exception, e.g., a memory protection violation or an attempt to address an inaccessible memory location. The program order identifier may be shared by multiple pipelines of the LSU 117. Operation proceeds to block 804.

At block 804, hashed address tags and page attributes (e.g., hashed tags 308 and page attributes 312 of FIG. 3) may be stored in a virtually-indexed, virtually-tagged directory (e.g., hashed tag array 434 of FIG. 4). In the embodiment of FIG. 6, the page attributes may be stored in the L1 DTLB 699. Operation proceeds to block 806.

At block 806, in response to a virtual address of a load operation (e.g., load address 224), a hit/miss prediction and page attributes (e.g., early miss prediction 228 and page attributes 226 of FIG. 4) associated with a memory page that includes the cache line implicated by the virtual load address are provided (e.g., by hashed tag array 434 of FIG. 4). In the embodiment of FIG. 6, the page attributes may be provided by the L1 DTLB 699 as page attributes 226 in response to the virtual load address 224, and the hit/miss indication may be provided as miss indication 228 by comparator 444. Operation proceeds to block 808.

At block 808, the hit/miss prediction and the page attributes as well as a comparison of a program identifier of the load operation and the maintained program order identifier of the oldest architectural exception need generating operation are used to detect the condition in which the first load operation generates a need for an architectural exception, the second load operation misses in the data cache, and the second load operation is newer in program order than the first load operation.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor that mitigates side channel attacks, comprising:
a cache memory;
fill request generation logic configured to generate a request to fill the cache memory with a cache line implicated by a memory address that misses in the cache memory;
wherein the processor is configured to perform speculative execution of instructions;
wherein the processor is configured to execute instructions out of program order; and
at least one execution pipeline configured to:
receive first and second load operations;
detect a condition in which the first load operation generates a need for an architectural exception, the second load operation misses in the cache memory, and the second load operation is newer in program order than the first load operation; and
prevent state of the cache memory from being affected by the miss of the second load operation by inhibiting the fill request generation logic from generating a fill request for the second load operation or by canceling the fill request for the second load operation if the fill request generation logic has already generated the fill request for the second load operation;
wherein to prevent the state of the cache memory from being affected by the miss of the second load operation means there are no side effects on the cache memory as a result of the miss of the second load operation in the cache memory.

2. The microprocessor of claim 1,
wherein the cache memory comprises a directory that holds hashed address tags and page attribute information of cache lines present in the cache memory;
wherein the directory provides a hit/miss prediction and the page attribute information based on the hashed address tags for use in determining the condition; and
wherein the page attribute information and the hit/miss prediction are provided earlier in the at least one execution pipeline than a correct hit/miss indication.

3. The microprocessor of claim 2,
wherein the cache memory and directory are virtually indexed and virtually tagged.

4. The microprocessor of claim 1, further comprising:
a program order identifier, maintained by the at least one execution pipeline, that identifies a program order of an oldest operation that has generated a need for an architectural exception; and
wherein to detect that the second load operation is newer in program order than the first load operation, the at least one execution pipeline compares a program order identifier associated with each received load operation with the maintained program order identifier.

5. The microprocessor of claim 4,
wherein the at least one execution pipeline comprises a plurality of pipelines for concurrently executing a corresponding plurality of load operations; and wherein pipelines of the plurality share the maintained program order identifier.

6. The microprocessor of claim 1,
wherein the first load operation generates the need for the architectural exception because a memory address specified by the first load operation is inaccessible or the first load operation does not have permission to access the memory address specified by the first load operation.

7. The microprocessor of claim 1,
wherein the at least one execution pipeline is further configured to:
  receive a store operation that is older than the first load operation;
  detect a second condition in which the store operation generates a need for an architectural exception, the second load operation misses in the cache memory, and the second load operation is newer in program order than the store operation; and
  prevent state of the cache memory from being affected by the miss of the second load operation by inhibiting the fill request generation logic from generating a fill request for the second load operation or by canceling the fill request for the second load operation if the fill request generation logic has already generated the fill request for the second load operation.

8. A method for mitigating side channel attacks in a microprocessor having a cache memory, at least one execution pipeline, and fill request generation logic configured to generate a request to fill the cache memory with a cache line implicated by a memory address that misses in the cache memory, comprising:
  wherein the processor is configured to perform speculative execution of instructions;
  wherein the processor is configured to execute instructions out of program order; and
  receiving, by the at least one execution pipeline, first and second load operations;
  detecting, by the at least one execution pipeline, a condition in which the first load operation generates a need for an architectural exception, the second load operation misses in the cache memory, and the second load operation is newer in program order than the first load operation; and
  preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation;
  wherein to prevent the state of the cache memory from being affected by the miss of the second load operation means there are no side effects on the cache memory as a result of the miss of the second load operation in the cache memory.

9. The method of claim 8, further comprising:
  wherein the cache memory comprises a directory that holds hashed address tags and page attribute information of cache lines present in the cache memory;
  providing, by the directory, a hit/miss prediction and the page attribute information based on the hashed address tags;
  using, by the at least one execution pipeline, the hit/miss prediction and the page attribute information of a predicted present cache line to determine the condition; and
  wherein the page attribute information and the hit/miss prediction are provided earlier in the at least one execution pipeline than a correct hit/miss indication.

10. The method of claim 9,
wherein the cache memory and directory are virtually indexed and virtually tagged.

11. The method of claim 8, further comprising:
  maintaining, by the at least one execution pipeline, a program order identifier that identifies a program order of an oldest operation that has generated a need for an architectural exception; and
  wherein said detecting that the second load operation is newer in program order than the first load operation comprises comparing a program order identifier associated with each received load operation with the maintained program order identifier.

12. The method of claim 11, further comprising:
  wherein the at least one execution pipeline comprises a plurality of pipelines for concurrently executing a corresponding plurality of load operations; and
  sharing, by the pipelines of the plurality, the maintained program order identifier.

13. The method of claim 8,
wherein the first load operation generates the need for the architectural exception because a memory address specified by the first load operation is inaccessible or the first load operation does not have permission to access the memory address specified by the first load operation.

14. The method of claim 8, further comprising:
  receiving, by the at least one execution pipeline, a store operation that is older than the first load operation;
  detecting, by the at least one execution pipeline, a second condition in which the store operation generates a need for an architectural exception, the second load operation misses in the cache memory, and the second load operation is newer in program order than the store operation; and
  preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation.

15. A non-transitory computer-readable medium having instructions stored thereon that are capable of causing or configuring a microprocessor for mitigating side channel attacks, the microprocessor having a cache memory, at least one execution pipeline, and fill request generation logic configured to generate a request to fill the cache memory with a cache line implicated by a memory address that misses in the cache memory, wherein the microprocessor is configured by the instructions to perform operations comprising:
  wherein the processor is configured to perform speculative execution of instructions;
  wherein the processor is configured to execute instructions out of program order; and
  receiving, by the at least one execution pipeline, first and second load operations;

detecting, by the at least one execution pipeline, a condition in which the first load operation generates a need for an architectural exception, the second load operation misses in the cache memory, and the second load operation is newer in program order than the first load operation; and preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation;

wherein to prevent the state of the cache memory from being affected by the miss of the second load operation means there are no side effects on the cache memory as a result of the miss of the second load operation in the cache memory.

16. The non-transitory computer medium of claim 15, the operations further comprising:

wherein the cache memory comprises a directory that holds hashed address tags and page attribute information of cache lines present in the cache memory;

providing, by the directory, a hit/miss prediction and the page attribute information based on the hashed address tags;

using, by the at least one execution pipeline, the hit/miss prediction and the page attribute information of a predicted present cache line to determine the condition; and wherein the page attribute information and the hit/miss prediction are provided earlier in the at least one execution pipeline than a correct hit/miss indication.

17. The non-transitory computer medium of claim 16, wherein the cache memory and directory are virtually indexed and virtually tagged.

18. The non-transitory computer medium of claim 15, the operations further comprising:

maintaining, by the at least one execution pipeline, a program order identifier that identifies a program order of an oldest operation that has generated a need for an architectural exception; and wherein said detecting that the second load operation is newer in program order than the first load operation comprises comparing a program order identifier associated with each received load operation with the maintained program order identifier.

19. The non-transitory computer medium of claim 18, the operations further comprising:

wherein the at least one execution pipeline comprises a plurality of pipelines for concurrently executing a corresponding plurality of load operations; and sharing, by the pipelines of the plurality, the maintained program order identifier.

20. The non-transitory computer medium of claim 15, wherein the first load operation generates the need for the architectural exception because a memory address specified by the first load operation is inaccessible or the first load operation does not have permission to access the memory address specified by the first load operation.

21. The non-transitory computer medium of claim 15, the operations further comprising:

receiving, by the at least one execution pipeline, a store operation that is older than the first load operation;

detecting, by the at least one execution pipeline, a second condition in which the store operation generates a need for an architectural exception, the second load operation misses in the cache memory, and the second load operation is newer in program order than the store operation; and preventing, by the at least one execution pipeline, state of the cache memory from being affected by the miss of the second load operation by inhibiting the fill request generation logic from generating a fill request for the second load operation or by canceling the fill request for the second load operation if the fill request generation logic has already generated the fill request for the second load operation.

22. The microprocessor of claim 1, wherein said canceling the fill request for the second load operation comprises invalidating an entry occupied by the fill request in a fill request buffer of the microprocessor.

23. The method of claim 8, wherein said canceling the fill request for the second load operation comprises invalidating an entry occupied by the fill request in a fill request buffer of the microprocessor.

24. The non-transitory computer medium of claim 15, wherein said canceling the fill request for the second load operation comprises invalidating an entry occupied by the fill request in a fill request buffer of the microprocessor.

* * * * *